United States Patent
Smith et al.

(10) Patent No.: US 8,757,441 B2
(45) Date of Patent: Jun. 24, 2014

(54) DISPOSABLE ASSEMBLY FOR A REUSABLE URN OR VESSEL

(71) Applicants: Mark A. Smith, Plainfield, IL (US); Carsten Pfromm, Glen Ellyn, IL (US)

(72) Inventors: Mark A. Smith, Plainfield, IL (US); Carsten Pfromm, Glen Ellyn, IL (US)

(73) Assignee: DS Smith Plastics Limited, London (GB)

( * ) Notice: Subject to any disclaimer, the term of this patent is extended or adjusted under 35 U.S.C. 154(b) by 0 days.

(21) Appl. No.: 13/645,315

(22) Filed: Oct. 4, 2012

(65) Prior Publication Data

US 2013/0037568 A1    Feb. 14, 2013

Related U.S. Application Data

(63) Continuation of application No. 12/369,637, filed on Feb. 11, 2009.

(51) Int. Cl.
*B65D 35/56* (2006.01)

(52) U.S. Cl.
USPC .............................. 222/105; 222/185.1; 251/7

(58) Field of Classification Search
USPC .............. 222/105, 185.1, 183, 212, 527, 529; 251/7
See application file for complete search history.

(56) References Cited

U.S. PATENT DOCUMENTS

| 172,929 | A | * | 2/1876 | Newton | 222/525 |
|---|---|---|---|---|---|
| 261,354 | A | * | 7/1882 | Johnson | 251/9 |
| 2,377,261 | A | * | 5/1945 | Norris | 222/184 |
| 2,549,207 | A | * | 4/1951 | Kestenbaum | 222/131 |
| 2,601,319 | A | * | 6/1952 | Norris et al. | 222/131 |
| 2,681,747 | A | * | 6/1954 | Norris et al. | 222/185.1 |
| 2,718,985 | A | * | 9/1955 | Tamminga | 222/131 |
| 3,138,293 | A | * | 6/1964 | Roak et al. | 222/105 |
| 3,949,744 | A | * | 4/1976 | Clarke | 604/246 |
| 4,044,989 | A | * | 8/1977 | Basel et al. | 251/7 |
| 4,516,691 | A | * | 5/1985 | Christine et al. | 222/83.5 |
| 4,528,161 | A | * | 7/1985 | Eckert | 422/509 |
| 5,188,259 | A | * | 2/1993 | Petit | 222/63 |
| 5,249,716 | A | * | 10/1993 | O'Sullivan | 222/568 |
| 5,732,854 | A | * | 3/1998 | Ruben et al. | 222/99 |
| 5,884,648 | A | * | 3/1999 | Savage | 137/1 |
| 6,378,730 | B1 | * | 4/2002 | Reddy et al. | 222/83 |
| 6,607,097 | B2 | * | 8/2003 | Savage et al. | 222/1 |
| 7,334,702 | B2 | * | 2/2008 | Cunningham et al. | 222/1 |
| 7,641,170 | B2 | * | 1/2010 | Spray et al. | 251/6 |
| 7,721,921 | B2 | * | 5/2010 | Ramusch et al. | 222/505 |
| 8,052,012 | B2 | * | 11/2011 | Kelly et al. | 222/399 |
| 2004/0099687 | A1 | * | 5/2004 | Magermans et al. | 222/105 |
| 2004/0104246 | A1 | * | 6/2004 | Kawaguchi et al. | 222/83 |
| 2007/0205216 | A1 | * | 9/2007 | Smith | 222/81 |
| 2008/0029540 | A1 | * | 2/2008 | Johnson | 222/83 |
| 2010/0206900 | A1 | * | 8/2010 | Dobrusskin et al. | 222/95 |

* cited by examiner

*Primary Examiner* — Kevin P Shaver
*Assistant Examiner* — Donnell Long
(74) *Attorney, Agent, or Firm* — Seyfarth Shaw LLP

(57) ABSTRACT

The present invention provides a container assembly for use with a reusable urn or vessel. The assembly includes a (1) flexible pouch, (2) a fitment connected to the pouch and having a flexible flange and a first fluid passageway therethrough in fluid communication with the chamber, (3) a tubing adapter having a first end connected to the fitment and a second end having a member for connecting to a tubing and a second fluid passageway in fluid communication with the first fluid passageway; and (4) wherein the flexible flange is capable of bending to conform to an interior wall of the urn or vessel to place the second fluid passageway in alignment with an axis of a through hole in the urn or vessel.

23 Claims, 5 Drawing Sheets

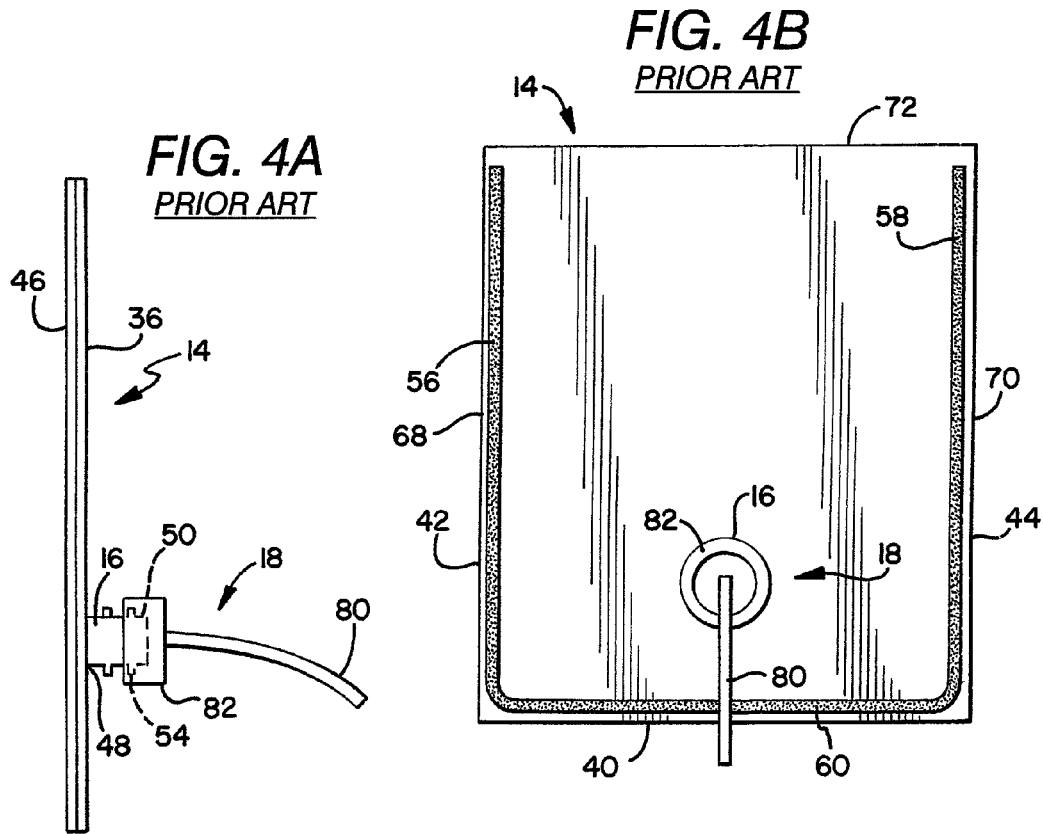
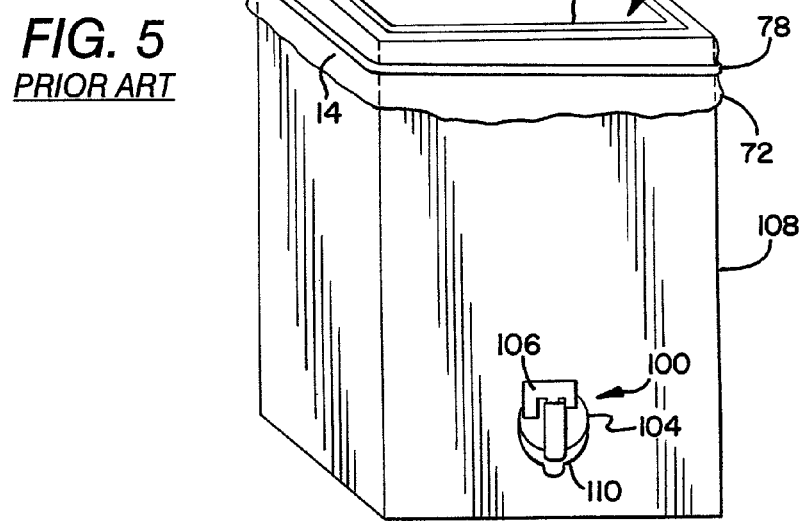

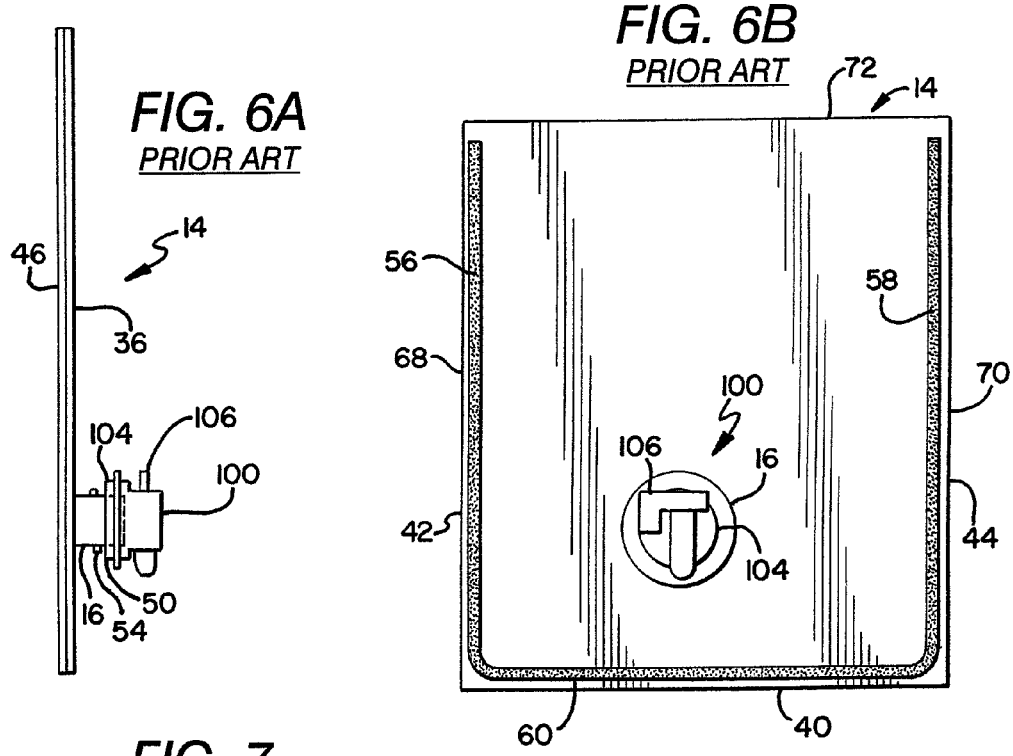
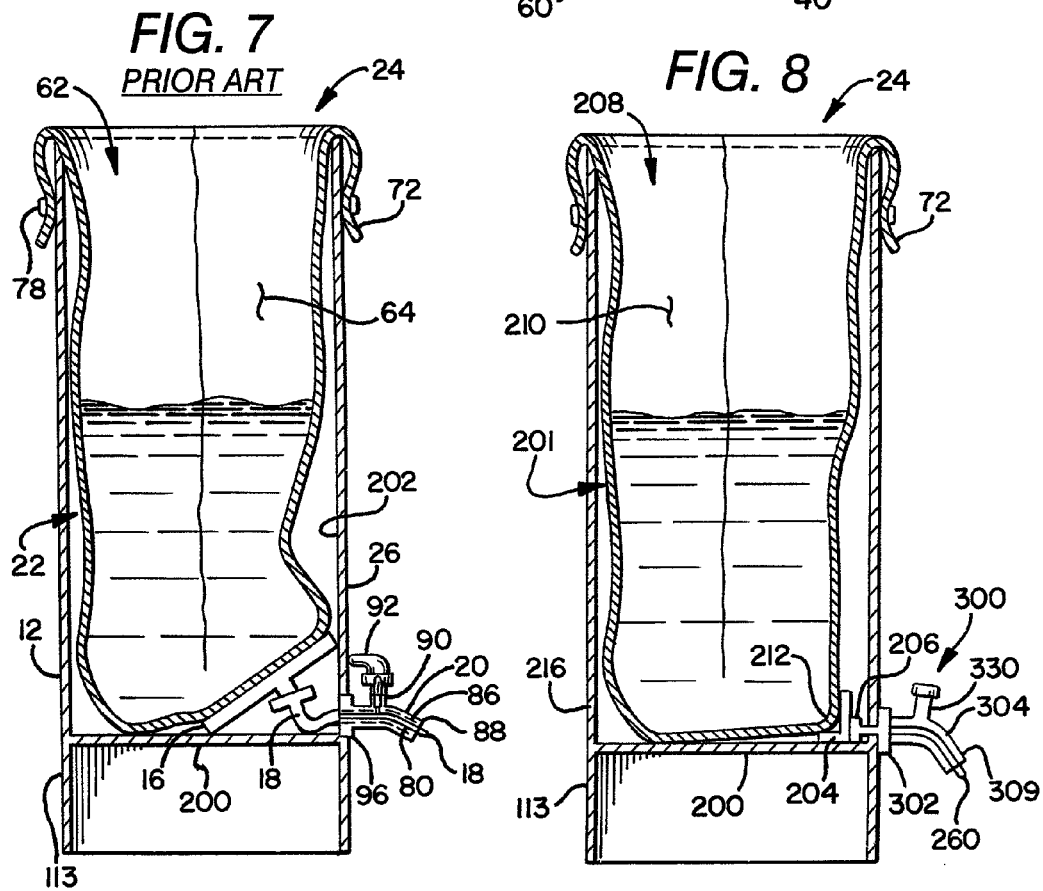

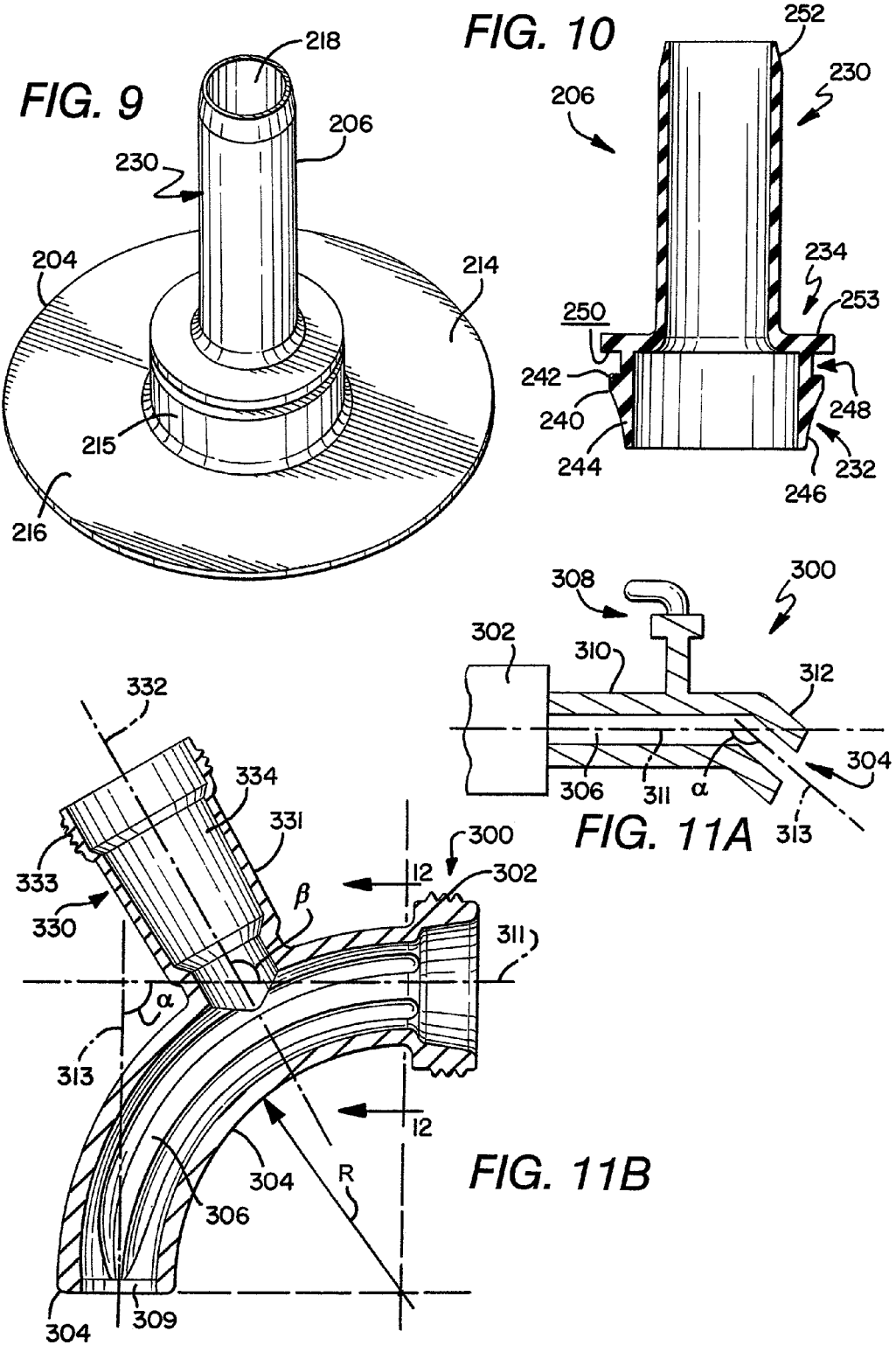

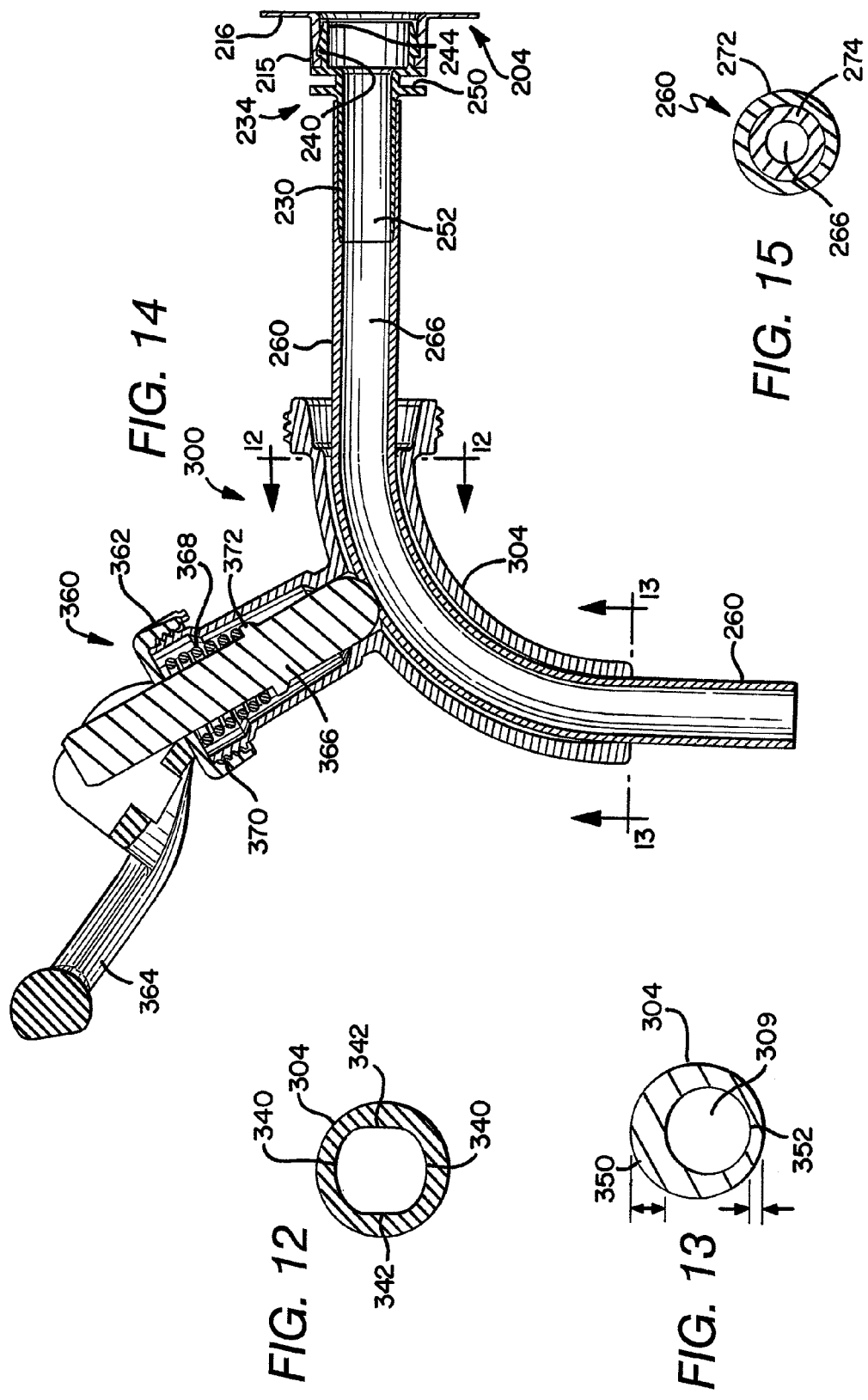

US 8,757,441 B2

DISPOSABLE ASSEMBLY FOR A REUSABLE URN OR VESSEL

RELATED APPLICATION

This application is a continuation of U.S. patent Ser. No. 12/369,637 filed on Feb. 11, 2009 which is incorporated herein by reference and made a part hereof.

TECHNICAL FIELD

The present invention provides a disposable assembly for use with a reusable urn or vessel for dispensing fluids and more particularly a disposable assembly having a pouch, a fitment on the pouch, a tubing adapter and a tubing that are assembled and inserted into a fluid chamber of a reusable urn for dispensing beverages for human consumption.

BACKGROUND OF THE INVENTION

Self-service dispensing containers have become very popular in restaurant settings for storing and dispensing liquid beverages. Such containers typically include a reusable urn with a dispensing valve at the bottom for gravitational dispensing of product therein. In some instances the urn is fitted with a disposable assembly having a pouch, a fitment attached to the pouch, and a tubing attached to the fitment. The pouch is placed inside the urn and the tubing is passed through the valve and liquid is placed within the pouch so that it does not contact any portion of the reusable urn or valve. Thus, the container and valve remain clean for longer periods of time and can be more easily and quickly cleaned during normal cleaning procedures.

BRIEF DESCRIPTION OF THE DRAWINGS

To understand the present invention, it will not be described by way of example, with reference to the accompanying drawings in which:

FIG. 4A is a side elevation view of a prior art disposable assembly for use with a reusable urn or vessel;

FIG. 4B is a front elevation view of the disposable assembly of FIG. 4A;

FIG. 5 is a perspective view of another prior art beverage dispensing system;

FIG. 6A is a side elevation view of another prior art disposable assembly for use with a reusable container of FIG. 5;

FIG. 6B is a front elevation view of the disposable assembly of FIG. 6A;

FIG. 7 is a cross-sectional front view of a prior art beverage dispensing system with a prior art disposable assembly;

FIG. 8 is a cross-sectional front view of a beverage dispensing system of the present invention;

FIG. 9 is a perspective view of a fitment and tube adapter assembly;

FIG. 10 is a cross-sectional view of a part of the tube adapter of FIG. 9;

FIGS. 11a,b are cross-sectional views of a faucet of the present invention;

FIG. 12 is a cross-sectional view taken along lines 12-12 of FIG. 11b of the faucet without the tubing showing a generally oval shaped-cross sectional shape;

FIG. 13 is an end view taken along lines 13-13 of FIG. 11b of the faucet outlet without the tubing showing a non-symmetrical outlet;

FIG. 14 is an assembly of the faucet of FIG. 11b with a fitment, tubing adapter and tubing; and FIG. 15 is a cross-sectional view of a tubing of the present invention.

DETAILED DESCRIPTION OF THE PREFERRED EMBODIMENT

Figure 1:
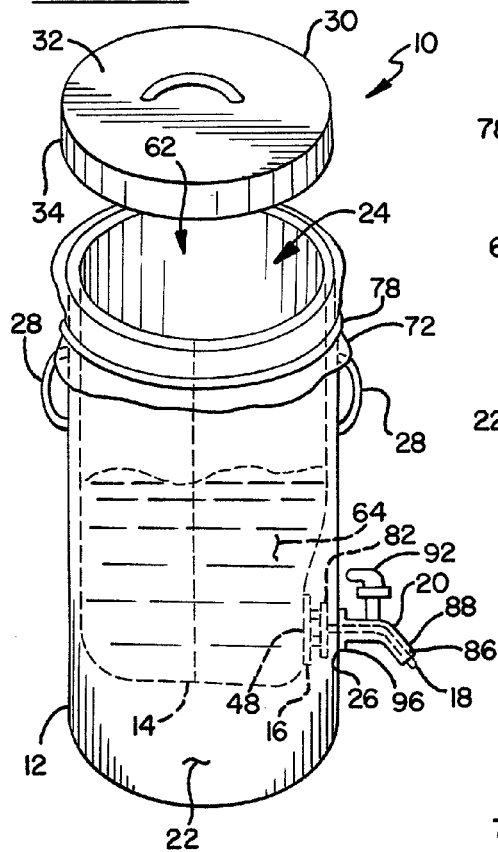
FIG. 1 is a partially exploded perspective view of a prior art beverage dispensing system.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 2:
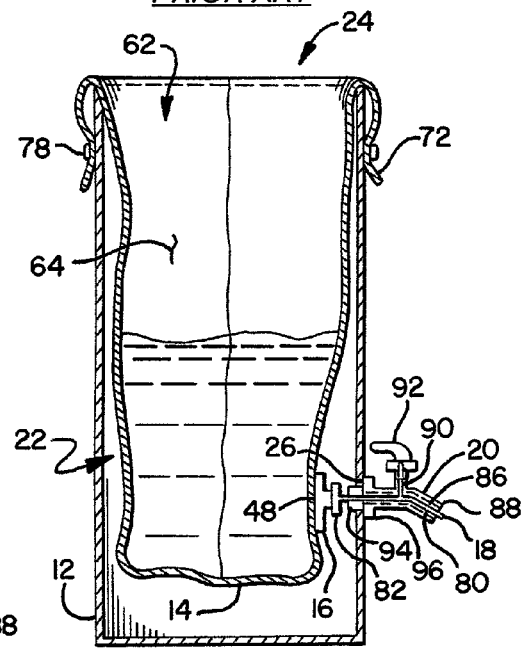
FIG. 2 is a central cross-sectional front view of the dispensing system of FIG. 1.

Referring now in detail to the Figures, and initially to FIGS. 1 and 2, there is shown a prior art containing and dispensing system 10 for a reusable containing vessel 12 that can be used with a disposable assembly having a pouch 14, a spout 16, a dispensing tube 18, and a dispensing valve 20. The containing vessel 12 is generally a stainless steel or aluminum urn having an interior cavity 22, a first opening 24, and a second opening 26. Two handles 28 extend from the sides of the containing vessel 12 for lifting and transporting the vessel. Additionally, a cover 30 or top is also provided for covering the first opening 24 leading to the interior cavity 22 of the vessel. The top 30 has a flat portion 32 and a rim portion 34 extending substantially perpendicular to the flat portion. The inside diameter of the rim 34 is dimensioned such that the top 30 fits over the cylindrical vessel 12 and is adjacent the outside diameter of the vessel 12. Typically, the vessel 12 will be placed on a platform or stand, or have an integral stand 113 to elevate the dispensing tube to a level where a cup or other container can be positioned under the dispensing tube.

Figure 3A:
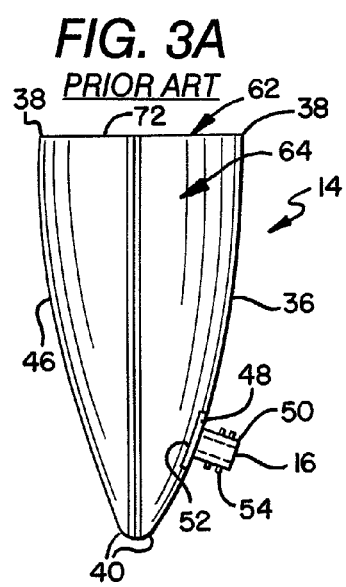
FIG. 3A is a side elevation view of a pouch.
Figure 3B:
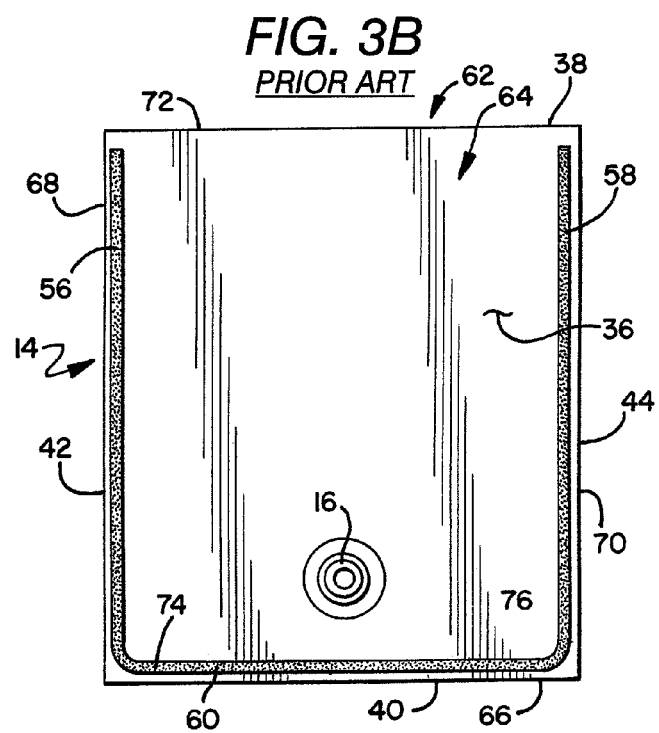
FIG. 3B is a front elevation view of the pouch of FIG. 3A.

The disposable assembly forms a liner for the containing vessel 12 and dispensing valve 20 such that liquid does not contact the internal components of either the containing vessel 12 or dispensing valve 20. FIGS. 3A and 3B show a prior art pouch 14 having a first or frontal panel 36 having a top 38, a bottom 40, and opposing first and second sides 42,44, and a second or rearward panel 46 similarly having a top 38, a bottom 40, and opposing first and second sides 42,44. The first panel 36 has an aperture or second opening 48 extending through the panel 36 proximal the bottom 40 of the first panel. The aperture 48 is dimensioned to receive the spout 16. Further illustrated in FIGS. 3A and 3B, the spout 16 has a cylindrical portion 50 extending generally perpendicularly from a generally circular flange portion 52 at the other end. The cylindrical portion 50 has a longitudinally extending fluid passageway therethrough having an inner diameter, and a longitudinal axis which extends through the center of the spout 16, from the cylindrical portion 50 through to the flanged portion 52. The cylindrical portion 50 also has ribs 54 extending from an outer surface of the spout. The ribs 54 allow other components to be connected to the spout 16.

The aperture 48 is formed with a punch that removes a portion of the wall to define the aperture 48. The aperture 48 is dimensioned to allow the passage of the cylindrical portion 50 but not the flange. The spout 16 is connected to the first panel 36 by heat sealing or other suitable method consistent with the use of the container. As is best shown in FIG. 3A, the flange 52 of the spout 16 has a first side which contacts the inner side of the first panel 36 of material. Through heat and pressure, the first panel 36 is heat sealed or welded to the flange 52 to permanently affix the spout 16 in place. The spout 16 is preferably located toward the bottom 40 of the pouch opposite the opening 62, such that when a manufactured pouch 14 is placed within the containing vessel 12, the liquid in the interior pocket 64 of the pouch will naturally feed out via gravitational forces.

The first and second panels 36,46 of the prior art pouch are generally made of a flexible plastic material which is capable of being heat sealed together. The material utilized should have a melt softening temperature greater than 175° F. and can be a linear low density polyethylene, polyolefins, polypropylene, polyvinyl chloride, polyester, nylon, and the like, including co-extruded and laminated materials, which exhibit similar characteristics may be used.

During manufacture of the pouch 14, the first and second panels 36,46 are heat sealed together adjacent their respective bottoms 40 and opposed first and second sides 42,44 to form a pouch 14 having three seal areas 56,58,60 and a first opening 62 to an interior pocket 64 between the connected first and second panels 36,46. When sealed together, the bottoms 40 of the panels form a sealed second end 66 of the pouch, and the opposed sides 42,44 of the panels form opposed sealed first and second sides 68,70 of the pouch 14, respectively. The tops of the panels form an open first end 72 of the pouch. Both of the opposing side seals 56,58 extend from the first end 72 of the pouch to the second end 66 of the pouch, and the bottom seal 60 extends about a length of the second end 66 of the pouch. A first end 74 of the bottom seal 60 is adjacent the first of the opposing side seals 56 and a second end 76 of the bottom seal 60 is adjacent a second of the opposing side seals 58. As such, the first opening 62 of the pouch extends horizontally from substantially the first seal area 56 to substantially the second seal area 58 adjacent the top or first end 72 of the pouch, and provides an entrance to the interior pocket 64. As seen in FIGS. 3A and 3B, the interior pocket 64 of the pouch is bounded on three sides by the three seal areas 56, 58, 60, and extends from the first opening 62 of the pouch adjacent the first end 72 of the pouch, to the third seal area 60 adjacent the second end or bottom 66 of the pouch. Because the pouch 14 is made of a material having a melt softening temperature of greater than 175° F., the interior pocket 64 of the pouch is able to contain boiling water for brewing tea, coffee or other hot liquids. A second opening 48 to the pouch exists through the spout opening, which is proximal the second end 66 of the pouch.

As is shown in FIGS. 1 and 2, the first end 72 of the pouch is wrapped over the first opening 24 of the containing vessel such that a portion of the pouch 14 extends on the outside of the containing vessel 12. An optional elastic band 78 is then placed over a portion of the first end 72 of the pouch 14 that extends to the outside of the containing vessel 12 to secure the pouch 14 thereto. The first end 72 of the pouch, however, can remain removably connected adjacent the first opening 24 of the containing vessel by other means. When the pouch 14 is in this position, liquid can be inserted into the interior pocket 64 of the pouch through the first opening 24 of the vessel.

FIGS. 4A and 4B show another prior art system where the dispenser 18 is connected to the spout 16. The dispenser 18 has a tube 80 having a rigid fitment 82 at one end thereof. The tube 80 is made of a flexible or elastic tubing or piping and is fixedly attached to the fitment 82. The prior art tubing 80 is fabricated from a styrene-ethylene-butylene-styrene block copolymer and typically has, in one form of the invention, an 11 mm. outside diameter, and approximately a 7 mm. inside diameter. Of course, it is contemplated using tubings of various inner and outer diameters so long as they can function as described herein. In one preferred form of the invention the outer diameter will be within the range of 10-13 mm and the inner diameter will be within the range of 7-10 mm. The fitment 82 is dimensioned to fixedly attach to the cylindrical portion 50 of the spout 16 of the pouch 14 shown in FIGS. 3A and 3B. The fitment snaps 82 onto the ribs 54 of the spout, however, other connection means, including press fit and screw on connectors are also contemplated. As illustrated in FIGS. 1 and 2, the tube 80 is dimensioned to be inserted through an aperture or channel 86 in the dispensing valve 20.

The prior art dispensing valve 20 is connected to the containing vessel 12 at the second opening 26 of the containing vessel as illustrated in FIGS. 1 and 2. A channel 86 extends through the body of the dispensing valve 20 to a nozzle 88 at the end of the dispensing valve 20. The channel 86 provides that the nozzle 88 is in open communication with the second opening 26, and thus the interior cavity 22, of the containing vessel 12. The dispensing valve 20 has an adjustable valve 90 which controls the flow of liquid through the channel 86. The adjustable valve 90 is controlled by a handle 92 at the top of the dispensing valve 20. The valve 90 is a protruding crimper which controls the rate of egress of liquid through the dispensing tube 18 by closing a portion of the dispensing tube 18 such that liquid cannot pass through. The dispensing tube 18 extends through the channel 86 of the dispensing valve 20. By rotating the handle 92 the valve 90 increases or decreases the amount of liquid that is able to flow through the dispensing tube 18 thus controlling the rate of egress of liquid from within the interior pocket of the pouch. When fully engaged, the valve 90 stops all flow of liquid through the dispensing tube 18. Generally, the end of the dispensing valve 20 opposite the nozzle 88 has a threaded portion 94 extending from a shoulder 96 of the dispensing valve 20. This threaded portion 94 extends through the second opening 26 of the containing vessel 12 and partially into the interior cavity 22 such that the shoulder 96 of the dispensing valve contacts the outside wall of the containing vessel 12 adjacent the second opening 26. A nut (not shown) within the interior cavity 22 of the containing vessel is then screwed on the threaded portion 94 of the dispensing valve 20 to fix the dispensing valve in place.

Accordingly, one of the initial steps required to set up the system even before the pouch 14 is placed within the interior cavity 22 of the containing vessel 12 is to attach the dispensing tube 18 via the fitment 82 thereof to the spout 16. Next, if the dispensing valve 20 is not already attached to the containing vessel 12, the dispensing valve 20 must be connected at the second opening 26 of the containing vessel such that the second opening 26 and the channel 86 through the dispensing valve are in open communication. Once the dispensing valve 20 is in place, the pouch 14 is inserted into the interior cavity 22 of the containing vessel 12.

FIGS. 6A and 6B illustrate another prior art dispenser 100 which is connected to the spout 16. (Like components of this prior art dispenser will be described with the same reference numerals as the first prior art dispenser.) The dispenser 100 comprises a dispensing valve having a fitment 104 thereon. The fitment 104 is dimensioned to fixedly attach the dispenser 100 to the cylindrical portion 50 of the spout 16 of the pouch 14 shown in FIGS. 3A and 3B. Like the previous dispenser, the fitment 104 snaps onto the ribs 54 of the spout. The dispensing valve portion of the dispenser 100 has a rotatable member 106 which, when manipulated, controls the rate of egress of liquid through the dispenser 100. Thus, unlike the first prior art dispenser, the dispenser 100 and the dispensing are a single component. Accordingly, when using this dispenser 100 as shown in FIGS. 6A and 6B, a separate dispensing valve 20 is not required. With this embodiment, liquid contacts only the interior pocket 64 of the pouch, an interior of the spout 16, and an interior of the dispensing valve 100. Since the pouch 14, spout 16, and dispensing valve 100 are disposable, they are adapted to be removed from the containing vessel 108 after use and discarded. Only the containing vessel 108 with its cover (not shown) is a permanent fixture. As such, the system is adapted to allow for the installation of a new pouch, spout, and dispensing valve daily to maintain a completely sanitized system. Any bacteria from the liquid only contacts the interior of the disposable items and does not contaminate the permanent fixtures.

These prior art dispensing systems are more fully set forth in the commonly owned U.S. Pat. No. 6,116,467 which is incorporated herein by reference in its entirety and made a part hereof. Due to problems encountered in using the disposable insert assemblies described above with urns and vessels having exit ports in close proximity to a bottom wall of the urn, a new approach was needed for the disposable assembly.

More specifically, FIG. 7 shows in certain existing urns or vessels that are adapted for use with a Tomlinson faucet which is well known in the art. A port of the vessel for mounting the Tomlinson valve is located in close proximity to a bottom wall 200 of the vessel. In attempting to use the prior art disposable assembly (pouch 14, spout 16, dispensing tube 18 and dispensing valve 20 described above with reference to FIGS. 1-4B), results in a kinked dispensing tube 18 due to an interference between the rigid flange of the spout 16 and the side and bottom walls of the vessel, and contact of the dispensing tube with the bottom wall 200 of the vessel. The present invention provides a disposable assembly insert compatible with such vessels and which allows for a favorable flow rate through the dispensing tube and a desired angle of dispensing.

To this end, FIGS. 8-10 shows yet another preferred embodiment of a dispensing assembly and system having a disposable assembly fitted to a reusable urn or vessel to allow for using the urn without contaminating an interior portion of the reusable vessel. In one preferred form of the invention, a disposable dispensing assembly 201 includes a flexible pouch 202, a fitment 204 and a tubing adapter 206. The fitment 204 and tubing adapter 206 when assembled are considerably smaller than the prior art disposable assembly shown in FIGS. 1-7, and, therefore, will be referred to below in the Comparative Example as Mini. The pouch 202 has a sidewall 208 with an outer planar surface 210. A hole 212 is provided through the sidewall 208.

The fitment 204 has a generally circular flange 214 having a planar surface 216 and a generally centrally disposed annular wall 215 extending axially away from the planar surface 216 defining a fluid passage 218 of the annular wall and circumjacent a through a hole (not shown) of the fitment 204. The circular flange of the fitment is attached to the outer planar surface 210 of the pouch with the through hole 212 of the pouch and the through hole of the fitment being in registration to allow for fluid communication between the contents of the pouch and an exterior of the pouch.

The tubing adapter 206 as shown in FIGS. 9 and 10 has a first generally cylindrical wall 230 having a first diameter, a second generally cylindrical wall 232 having a second diameter greater than the first diameter and an annular flange 234 therebetween. The second cylindrical wall 232 has a semi-arrow shaped outer surface 240 having a base 242, a tip 244 and a radially inwardly sloping surface 246 extending from the base 242 to the tip 244. An annular notch 248 separates the base 242 from a bottom surface 250 of the annular flange 234. The first cylindrical wall 230 extends axially away from the annular flange 234 and has a radially inwardly tapering distal end 252 for ease of insertion into a lumen 266 of tubing 260. The annular flange has an upper surface 253 that serves as a stop and a visual indication the tubing adapter is fully inserted into the lumen 266.

The second cylindrical wall 232 is inserted into the annular wall 215 of the fitment 204 and the notch 248 engages a structure (not shown) on an inner surface of the annular wall 215 to fixedly attach the tubing adapter 206 to the fitment 204.

As shown in FIG. 8, the fitment 204 is sufficiently flexible to adapt to the dimensions of the space between the bottom wall 200 and sidewall 216 of the vessel so that the tubing 260 does not kink upon insertion into the passageway 86 of the faucet or during use.

In a preferred form of the invention, the angle of dispensing should be from about 45° to about 100°, more preferably from 55° to about 90° and most preferably from 65° to about 90°. To this end, FIGS. 11a,b shows a faucet 300 having a fitment 302 at one end, a rigid dispensing tube 304 extending axially away therefrom and defining a fluid passageway or lumen 306 therethrough, and a valve 308 to control the flow of fluid through the faucet to an outlet 309. FIG. 11a shows one preferred form of the faucet where the dispensing tube 304 is segmented having a first portion 310 extending along an axis 311 and a second distal portion 312 extending along a second axis 313 forming an angle α with the axis 311. The angle α should be from about 45° to about 100°, more preferably from about 55° to about 90° and most preferably from 65° to about 90°.

FIG. 11b shows another preferred form of the faucet 300 where the dispensing tube 304 tube is arcuate or curved over the entire length of the dispensing tube 304 having a radius R and the axis 313 forms an angle α with the axis 311 within the ranges set forth above. The faucet has a valve housing 330 having a generally cylindrical wall 331 having an axis 332 and defining a chamber 334 therein. The axis 332 forms an angle β with axis 311. In a preferred form of the invention, angle β can be from about 0° (i.e., axis 332 parallel to axis 311) to about 90° (axis 332 perpendicular to axis 311) and more preferably from about 75° to about 35° and most preferably from about 60° to about 45°. The cylindrical wall 331 has a set of threads 333 at a distal most end. The faucet 300 can be used with the Mini disposable assembly shown in FIGS. 8-14, or with the larger disposable assembly shown in FIGS. 1-7, and will be referred to as Large in the Comparative Example below.

In another preferred form of the invention shown in FIG. 12, the dispensing tube 304 can have a circular cross-sectional shape or a generally oval shape having rounded ends and flattened sidewalls 342. It is believed, this oval shape resist kinking of tubing 260 upon insertion into the lumen 306 of the dispensing tube 304.

In another preferred from of the invention shown in FIG. 13, the fluid outlet 309 has a non-symmetrical outlet where the fluid outlet 309 is not centered, or offset. Thus, a wall portion 350 on top of the outlet has a greater thickness than a bottom portion 352. For example, for a outlet having a diameter of 0.650 inches a top portion can have a thickness of about 0.140 inches and the bottom portion can have a thickness of about 0.90 inches or about 65% of the thickness of the top portion. In another preferred form of the invention, a first portion of the wall will have a thickness with respect to a second portion of the wall of the outlet within a range of ratios from about 1:3 to about 1:1.1. In other words, one portion of the wall can be from about three times as thick to about 1.1 times as thick as a second portion of the wall. This offset assist in directing the tubing 260 radially inwardly toward the faucet to achieve a near 90° angle of dispensing. The offset opening can be generally circular or generally oval shaped as described above.

FIG. 14 shows the faucet of FIG. 11b in an assembly with the fitment 204, tubing adapter 206 and the tubing 260. A valve assembly 360 is shown mounted to the valve housing 340 and having a threaded cap 362, a lever arm 364, a valve element 366 and a compression spring 368. The threaded cap 362 has a set of threads 370 that mates with threads 333 of the cylindrical wall. The valve is shown in an open position where the valve element 366 does not constrict the flow of fluid through the flexible tubing 260. Upon rotation of the valve arm 364 the valve element 360 is moved axially downwardly to impinge upon the tubing to close off the flow of fluid through the tubing. The spring 368 is trapped between an inner surface of the threaded cap 362 and impinges upon an annular flange 372 of the valve element 366 to bias the valve into a closed, non-fluid dispensing position.

It has been observed by users of tube 18 of a monolayer of SEBS, that it tends to kink upon insertion into the channel 86 of the dispensing valve 20. In a preferred form of the invention, the tubing resists kinking during insertion into the dispensing valve 20 and has an increased inner diameter of greater than 7 mm while maintaining an 11 mm outer diameter. The increased inner diameter allows for higher flow rates through the tubing when compared with tubings of lesser diameter and allows for dispensing of fluids with a broader range of viscosities when compared to smaller inner diameter tubings.

FIG. 15 shows the improved, multilayer tube 270 having an outer layer 272, an inner layer 274 defining a central lumen 266. The lumen is dimensioned to receive the first cylindrical wall 230 of the tubing adapter and form an interference fit therewith. In a preferred form of the invention the inner layer is a hydrogentated or non-hydrogenated styrene and hydrocarbon copolymer, more preferably a styrene and diene copolymer, and even more preferably a styrene and diene block copolymer. The block copolymer can be a diblock, triblock, starblock or the like, and most preferably is a triblock styrene-ethylene-butylene-styrene copolymer. One suitable material is KRATON type polymer.

The outer layer 272 is preferably an olefin material and more preferably an ethylene terpolymer and even more preferably an ethylene and alpha-olefin copolymer. As used herein, the term "interpolymer" includes copolymers, terpolymers either random, stereoregular (such as isotactic, syndiotactic) or block.

Suitable ethylene and α-olefin interpolymers preferably have a density, as measured by ASTM D-792 of less than about 0.915 g/cc and are commonly referred to as very low density polyethylene (VLDPE), linear-low density polyethylene (LLDPE) ultra low density ethylene (ULDPE) and the like. The α-olefin should have from 3-17 carbons, more preferably from 4-12 and most preferably 4-8 carbons. In a preferred form of the invention, the ethylene and α-olefin copolymers are obtained using single site catalysts. Suitable single site catalyst systems, among others, are those disclosed in U.S. Pat. Nos. 5,783,638 and 5,272,236. Suitable ethylene and α-olefin copolymers include those sold by Dow Chemical Company under the AFFINITY tradename, Dupont-Dow under the ENGAGE tradename and Exxon under the EXACT and PLASTOMER tradenames.

In a preferred form of the invention, the ratio of thicknesses of the outer layer 272 to the inner layer 274 is from about 1:4 to about 1:2 and more preferably from about 1:3 to about 1:2.5.

It is contemplated that the tubing can have a portion that is compressed into an accordion shape that is capable of flexing into discrete positions much like flex straw. This will provide of ease of insertion of the tubing into the faucet.

COMPARATIVE EXAMPLES

Four different faucets shown in FIGS. 11b-14, were assembled with a Large disposable assembly shown in FIGS. 1-7 or with a Mini disposable assembly shown in FIGS. 8-10 and 14 for a total of eight faucet assemblies. Faucet 1 had a radius R of 1.495 inches, a faucet discharge having a circular shape in cross section and an offset, asymmetrical discharge FIG. 13. Faucet 2 was the same as Faucet 1 but had a symmetrical discharge. Faucet 3 had a radius R 1.625 inches, a faucet discharge with an oval cross-sectional shape (FIG. 12) and an offset, asymmetrical discharge (FIG. 13). Faucet 4 is the same as faucet 3 except it has a symmetrical discharge.

The flow rate results of these eight tested assemblies compared favorably with the prior art device shown in FIG. 2, where the dispensing angle is 45° and has the Large disposable assembly. The test results shown below indicate that the faucet design shown in FIGS. 11b-14 substantially improves flow rate of a prior art container with a prior art disposable assembly.

The results shown in the Table below also compare favorably with a prior art urn having a Tomlinson valve with a 90° dispensing angle and with no disposable assembly wherein the contained fluid comes into direct contact with the walls of the urn and an interior fluid conduit of the Tomlinson valve. This prior art container was found to have a flow rate of 5.2 oz/sec.

Each faucet assembly was mounted to a water containing urn and the time was recorded to dispense 16 oz of water. Each faucet was tested over 20 intervals, the time was averaged and the flow rate per ounce was calculated. The results are shown below in the following table. Overall, the Mini disposable of the present invention outperformed the Large, prior art, disposable assembly. Faucets 3 and 4 with a R of 1.625 inches outperformed the smaller radius of 1.495 inches. This is a surprising result as the Mini disposable is far smaller and weighs considerably less than the prior art disposable assembly shown in FIGS. 1-4. The Mini tubing adapter weighs about 1 g which is far lighter than the 3.4 g tubing adapter of the prior art. Also, the fitment of the Mini adapter weighs about 1.1 g which compares favorably to the 5.3 g fitment of the prior art disposable.

| FAUCET 1 | | FAUCET 2 | | FAUCET 3 | | FAUCET 4 | |
| --- | --- | --- | --- | --- | --- | --- | --- |
| Large | Mini | Large | Mini | Large | Mini | Large | Mini |
| 7.19 | 5.44 | 6.53 | 5.33 | 5.78 | 5.09 | 6.16 | 5.44 |
| 6.83 | 5.22 | 6.66 | 5.22 | 6.13 | 5.33 | 6.19 | 5.22 |
| 6.33 | 5.46 | 6.50 | 5.32 | 6.12 | 5.05 | 6.21 | 5.28 |
| 6.72 | 5.31 | 7.25 | 5.56 | 6.06 | 5.28 | 6.40 | 5.34 |
| 6.65 | 5.38 | 7.56 | 5.37 | 6.09 | 5.22 | 6.32 | 5.40 |
| 6.90 | 5.41 | 6.88 | 5.25 | 6.18 | 5.37 | 6.31 | 5.35 |
| 6.81 | 5.41 | 6.66 | 5.28 | 6.15 | 5.33 | 6.28 | 5.34 |
| 6.69 | 5.42 | 7.19 | 5.35 | 6.15 | 5.15 | 6.32 | 5.22 |
| 6.88 | 8.31 | 7.10 | 5.28 | 6.19 | 5.21 | 6.20 | 5.19 |
| 6.75 | 5.44 | 7.23 | 5.30 | 6.07 | 5.27 | 6.19 | 5.15 |
| 6.81 | 5.35 | 7.41 | 5.22 | 5.98 | 5.18 | 6.37 | 5.14 |
| 6.83 | 5.38 | 7.14 | 5.19 | 6.03 | 5.14 | 6.35 | 5.03 |
| 6.72 | 5.29 | 6.28 | 5.28 | 6.14 | 5.18 | 6.21 | 5.25 |
| 6.77 | 5.31 | 6.53 | 5.26 | 6.32 | 5.24 | 6.25 | 5.13 |
| 6.84 | 5.33 | 7.25 | 5.31 | 6.29 | 5.22 | 6.22 | 5.27 |
| 6.72 | 5.35 | 7.36 | 5.30 | 6.18 | 5.19 | 6.22 | 5.22 |

-continued

| FAUCET 1 | | FAUCET 2 | | FAUCET 3 | | FAUCET 4 | |
|---|---|---|---|---|---|---|---|
| Large | Mini | Large | Mini | Large | Mini | Large | Mini |
| 6.85 | 5.31 | 7.32 | 5.41 | 6.13 | 5.22 | 6.32 | 5.18 |
| 6.74 | 5.36 | 7.39 | 5.35 | 6.09 | 5.31 | 6.13 | 5.18 |
| 6.79 | 5.34 | 7.46 | 5.34 | 6.14 | 5.28 | 6.37 | 5.23 |
| 6.69 | 5.42 | 7.25 | 5.35 | 6.16 | 5.19 | 6.29 | 5.22 |
| AVERAGE FOR 16 OZ DISPENSING RATE IN OZ/SEC | | | | | | | |
| 6.78 | 5.36 | 7.05 | 5.31 | 6.12 | 5.22 | 6.27 | 5.24 |
| 2.35 | 2.98 | 2.26 | 3.01 | 2.61 | 3.06 | 2.55 | 3.05 |

While the specific embodiments have been illustrated and described, numerous modifications come to mind without significantly departing from the spirit of the invention, and the scope of protection is only limited by the scope of the accompanying claims.

We claim:

1. A faucet apparatus, comprising:
   a faucet fitment configured for coupling a faucet to an urn or vessel;
   a dispensing tube extending from the fitment away from the urn or vessel; and
   a first cross section of the dispensing tube proximate the faucet fitment and defining a first portion of a lumen, wherein the lumen is shaped and dimensioned for extending a tubing through its entire length without kinking the tubing, the first portion of the lumen having a generally oval shape, the generally oval shape defined by rounded ends and flattened sidewalls.

2. The apparatus of claim 1, further comprising: a distal end of the dispensing tube distal from the faucet fitment defining a second cross section of the dispensing tube, the distal end of the dispensing tube including asymmetric sidewall thickness and defining a second portion of the lumen.

3. The apparatus of claim 1, wherein the dispensing tube has an arcuate shape along its entire length from the proximal end to the distal end.

4. The apparatus of claim 3, comprising:
   a first axis perpendicular to a plane of the first cross section;
   a second axis perpendicular to a plane of the second cross section; and,
   an angle alpha between the first axis and the second axis, the angle alpha between about 100 degrees and about 45 degrees.

5. The apparatus of claim 4, wherein the angle alpha is between about 90 degrees and 55 degrees.

6. The apparatus of claim 4, wherein the angle alpha is between about to 90 degrees and 65 degrees.

7. The apparatus of claim 3, wherein a second cross section of the dispensing tube distal from the faucet fitment includes a first wall thickness of the dispensing tube and a second wall thickness of the dispensing tube that is different from the first wall thickness.

8. The apparatus of claim 7, wherein the second cross section of the dispensing tube has a diameter of about 0.650 inches, the first thickness has a thickness of about 0.140 inches and the second thickness has a thickness of about 0.90 inches.

9. The apparatus of claim 7, wherein the second thickness has a thickness about 65% of a thickness of the first thickness.

10. The apparatus of claim 7, wherein a wall thickness ratio defining a thickness of the first thickness versus a thickness of the second thickness is between about 3:1 and about 1.1:1.

11. The apparatus of claim 3, wherein an inner radius R of the arcuate shape is between about 1.495 inches and about 1.625 inches.

12. The apparatus of claim 11, wherein the inner radius R is about 1.625 inches.

13. The apparatus of claim 3, comprising:
   a first axis perpendicular to a plane of the first cross section; and
   a valve housing extending from the dispensing tube, the valve housing having a central axis and defining a cavity intersecting the lumen; and
   an angle beta between the first axis and the central axis, the angle beta between about 0 degrees and about 90 degrees.

14. The apparatus of claim 13, wherein the angle beta is between about 35 degrees and about 75 degrees.

15. The apparatus of claim 13, wherein the angle beta is between about 45 degrees and about 65 degrees.

16. The apparatus of claim 1, further comprising the tubing extending through the lumen along the entire length of the dispensing tube.

17. The apparatus of claim 16, wherein the tubing has an inner diameter of about 7 mm and an outer diameter of about 11 mm.

18. The apparatus of claim 16, wherein the tubing has a first layer of a styrene and hydrocarbon copolymer.

19. The apparatus of claim 18, wherein the tubing has a second layer of a polyolefin.

20. The apparatus of claim 19, wherein the second layer is an outer layer and the first layer is an inner layer.

21. The apparatus of claim 20 wherein a ratio of a thickness of the outer layer to a thickness of the inner layer is from about 1:4 to about 1:2.

22. The apparatus of claim 21 wherein the ratio of the thickness of the outer layer to the thickness of the inner layer is from about 1:3 to about 1:2.5.

23. The apparatus of claim 16, comprising:
   a flexible pouch defining a fluid chamber;
   a fitment connected to the flexible pouch, the fitment having a flexible flange and a generally cylindrical wall extending axially away from the flexible flange the generally cylindrical wall defining a first fluid passageway therethrough and in fluid communication with the chamber;
   wherein the flexible flange is attached to an outside surface of the pouch and is flexed through an angle of about 90 degrees along with the outside surface of the pouch to conform to an interior wall of the urn or vessel without kinking the tubing; and
   a tubing adapter having a first end connected to the fitment and a second end having a non-barbed member coupled to the tubing by a friction fit therebetween, the tubing adapter defining a second fluid passageway in fluid communication with the first fluid passageway.

* * * * *